(12) United States Patent
van Keogh (10) Patent No.: US 10,557,283 B2
(45) Date of Patent: Feb. 11, 2020

(54) HYDROPONIC TENT

(71) Applicant: Brollies and Parasols Limited, Penarth (GB)

(72) Inventor: Daniel van Keogh, Penarth (GB)

(73) Assignee: Brollies and Parasols Limited, Penarth (GB)

( * ) Notice: Subject to any disclaimer, the term of this patent is extended or adjusted under 35 U.S.C. 154(b) by 34 days.

(21) Appl. No.: 15/928,158

(22) Filed: Mar. 22, 2018

(65) Prior Publication Data

US 2018/0291643 A1    Oct. 11, 2018

(30) Foreign Application Priority Data

Apr. 5, 2017 (GB) .................................. 1705526.0

(51) Int. Cl.
*E04H 15/50* (2006.01)
*A01G 9/16* (2006.01)
(Continued)

(52) U.S. Cl.
CPC ............... *E04H 15/50* (2013.01); *A01G 9/16* (2013.01); *E04H 15/26* (2013.01); *A01G 31/02* (2013.01);
(Continued)

(58) Field of Classification Search
CPC ......... E04H 15/44; E04H 15/46; E04H 15/48; E04H 15/50; E04H 15/26; E04H 1/1222; E04H 1/1272; A01G 9/16; A01G 9/249
See application file for complete search history.

(56) References Cited

U.S. PATENT DOCUMENTS

| | | | |
|---|---|---|---|
| 2,897,831 A * | 8/1959 | Liden | E04H 15/44 135/118 |
| 4,607,656 A * | 8/1986 | Carter | E04H 15/50 135/122 |

(Continued)

FOREIGN PATENT DOCUMENTS

| | | |
|---|---|---|
| CN | 1483911 A | 3/2004 |
| CN | 202145777 U | 2/2012 |

(Continued)

OTHER PUBLICATIONS

Search Report under Section 17 for related Great Britain Patent Application No. GB1705526.0, dated Sep. 26, 2017, 2 pages.

*Primary Examiner* — David R Dunn
*Assistant Examiner* — Danielle Jackson
(74) *Attorney, Agent, or Firm* — Hovey Williams LLP; Kameron Kelly (57) ABSTRACT

A hydroponic tent is provided which comprises a tent fabric cover having an inner surface which is at least in part light-reflective, and a tent frame to support the tent fabric cover in an assembled condition. The tent frame comprises a plurality of support legs, a plurality of support linkages positioned at or adjacent to an in use upper end of the support legs, the plurality of support linkages being interconnected so as to allow the tent frame to collapse in concertina. There is further provided a hanging frame assembly having first and second support bars and at least one bridging bar, the first support bar being engagable with the tent frame at or adjacent to one of the plurality of support linkages, the second support bar being engagable with the tent frame at or adjacent to another one of the plurality of support linkages, and the at least one bridging bar being supportable between the first and second support bars.

16 Claims, 3 Drawing Sheets

FIG. 2a

FIG. 2b (51) Int. Cl.
*E04H 15/26* (2006.01)
*E04H 15/10* (2006.01)
*A01G 31/02* (2006.01)

(52) U.S. Cl.
CPC ............ *E04H 15/10* (2013.01); *Y02A 40/252* (2018.01); *Y02A 40/254* (2018.01)

(56) References Cited

U.S. PATENT DOCUMENTS

| | | | | |
|---|---|---|---|---|
| 5,073,401 | A * | 12/1991 | Mohr | A01G 31/042 426/138 |
| 6,089,247 | A * | 7/2000 | Price | E04H 15/48 135/145 |
| 8,707,976 | B2 * | 4/2014 | Bauer | B05B 13/0285 135/96 |
| 10,267,056 | B1 * | 4/2019 | Eastland | E04H 15/48 |
| 2003/0037812 | A1 * | 2/2003 | Stewart | A47K 3/286 135/96 |
| 2004/0177569 | A1 * | 9/2004 | Kim | E04H 15/44 52/83 |
| 2006/0213546 | A1 * | 9/2006 | Mitsui | E04H 15/42 135/121 |
| 2008/0087313 | A1 * | 4/2008 | Jang | E04H 15/44 135/145 |
| 2011/0170805 | A1 * | 7/2011 | Harmston | E04H 15/32 383/38 |
| 2014/0020727 | A1 * | 1/2014 | Kayser | E04H 15/44 135/148 |
| 2014/0116488 | A1 * | 5/2014 | Mallookis | E04H 15/50 135/145 |

FOREIGN PATENT DOCUMENTS

| | | |
|---|---|---|
| CN | 204370900 U | 6/2015 |
| CN | 204920439 U | 12/2015 |
| JP | H0998604 A | 4/1997 |
| JP | 2011169072 A | 9/2011 |

* cited by examiner

HYDROPONIC TENT

RELATED APPLICATIONS

This application claims the benefit under 35 U.S.C. § 119(a)-(d) of British Patent Application No. 1705526.0 filed on 5 Apr. 2017, the disclosure of which is incorporated by reference.

FIELD OF THE TECHNOLOGY

The present invention relates to a hydroponic tent suitable but not necessarily exclusively for the growing of plants in an indoor, environmentally controlled environment. The invention further relates to a hydroponic tent frame apparatus for such a tent, and to a method of assembling such a hydroponic tent.

BACKGROUND OF THE INVENTION

Hydroponic tents are used for growing of plants, such as flowers, fruit and vegetables, in controlled environmental conditions. This allows the plants to be grown in climatic conditions for which they are ill-suited, such as particularly dark or cold environments.

In order to provide an environmentally controlled hydroponic tent, there is typically a significant amount of associated equipment which is used to control the conditions therein. In particular, given that the hydroponic tent is an enclosed environment, there is generally a need to provide artificial lighting for photosynthesis for the plants.

Currently, environmental control equipment is introduced into the hydroponic tent at ground level, and electrical power is diverted to the equipment via connecting cables into the tent. In the case of artificial lighting, the lights are placed on stands which are positioned within the tent, and raised towards the top of the tent in order to illuminate plants lower down. Unfortunately, this wastes a large proportion of the available floor space inside the hydroponic tent.

Hydroponic tents are typically lightweight constructions, and can be provided for personal use for gardeners to, for example, provide gardening space on a rooftop or balcony. Space is therefore limited inside the hydroponic tents, and current frame constructions are ill-suited to mounting heavy equipment therein.

SUMMARY OF THE INVENTION

The present invention seeks to provide a hydroponic tent in which environmental control equipment can be safely and securely housed without compromising the total floorspace for plants inside the hydroponic tent, whilst also keeping the ease of assembly of current hydroponic tent arrangements.

According to a first aspect of the invention, there is provided a hydroponic tent comprising: a tent fabric cover having an inner surface which is at least in part light-reflective; a tent frame for supporting the tent fabric cover in an assembled condition, the tent frame comprising: a plurality of support legs; and a plurality of support linkages positioned at or adjacent to an in use upper end of the support legs, the plurality of support linkages being interconnected so as to allow the tent frame to collapse in concertina; and a hanging frame assembly having first and second support bars and at least one bridging bar, the first support bar being engagable with the tent frame at or adjacent to one of the plurality of support linkages, the second support bar being engagable with the tent frame at or adjacent to another one of the plurality of support linkages, and the at least one bridging bar being supportable between the first and second support bars.

The provision of the hanging frame assembly provides a convenient and readily-assemblable means of supporting environmental control equipment within a hydroponic tent. The tent frame, being collapsible in a concertinaed fashion can be assembled in a very straightforward manner, and the hanging frame assembly can be coupled to such a tent frame in a strong and simple manner. This beneficially maintains the ease of construction of existing hydroponic tents, whilst upgrading the functionality to permit raised environmental control equipment to be installed therein, leaving a greater floorspace for growing.

Preferably, the plurality of support linkages may comprise a plurality of outer support linkages positioned at or adjacent to the upper end of adjacent support legs, the plurality of outer support linkages interconnecting adjacent support legs so as to be collapsible in concertina; the tent frame further comprising a plurality of inner support linkages which are spaced apart from the support legs and which interengage opposite outer support linkages so as to be collapsible in concertina; the first support bar being engagable with the tent frame at or adjacent to one of the plurality of outer support linkages, and the second support bar being engagable with the tent frame at or adjacent to one of the plurality of inner support linkages.

The provision of inner and outer support linkages provides extra stability to the tent frame so as to more readily accept the weight of the hanging frame assembly, significantly reducing the risk of collapse of the tent frame in use.

In a preferred embodiment, the tent frame may further comprise a central support leg, positioned at an intersection between the plurality of inner support linkages.

In order to evenly distribute the weight of the apparatus hung from the hanging frame assembly, it is advantageous to provide a centrally positioned supporting leg inside the hydroponic tent to act as a brace. Whilst this would be awkwardly positioned in a standard tent, as it would inhibit free movement of individuals inside the tent, in the context of a hydroponic tent, there is minimal disruption to the space available for plants, and the reflective interior of the tent fabric cover ensures that there are no significant artificial shadows cast by the central leg which might inhibit growth of the plants in the tent.

Preferably, the central support leg may comprise a central engagement element at an in use upper end thereof, the second support bar having a complementary support engagement element for interengagement of the tent frame and the second support bar. Said central engagement element may be a central receiving aperture, and the support engagement element is a projection receivable within the central receiving aperture.

Advantageously, the central support leg can act as point of support for the hanging frame assembly, thereby more evenly distributing the load supplied on the tent frame. This significantly reduces the likelihood of the tent frame buckling under the weight of the environmental monitoring or control equipment.

Optionally, the tent frame may further comprise an engagement joint at an intersection between adjacent inner and outer support linkages, at least one of the first and second support bars having a complementary support engagement element for interengagement of the tent frame and first and/or second support bars. Such an engagement joint may include a joint receiving aperture, and the or each support engagement is a projection receivable within the joint receiving aperture. In one embodiment, the engagement joint may be pivotably engagable with the said adjacent inner and outer support linkages.

The provision of dedicated engagement joints in the support linkages allows for the concertinaing of the tent frame to occur without impediment, whilst still providing a strong and stable mounting point for the hanging frame assembly on the tent frame. This reduces the chance of the hanging frame assembly from accidentally or unintentionally becoming dislodged during use.

At least one support leg may comprise a leg engagement element at its in use upper end, the first support bar having a complementary support engagement element for interengagement of the tent frame and the first support bar. The leg engagement element may, in one embodiment, be a pin-receiving slot and the support engagement element is a pin-receiving aperture, and further comprising a locking pin for interconnecting the pin-receiving slot and pin-receiving aperture.

A locking pin configuration for mounting the hanging frame assembly to the tent frame may allow for a greater degree of tolerance when mounting the assembly, since there may be some play in to relative overlap between the pin-receiving slot and aperture. This can beneficially simplify the assembly of the hydroponic tent.

In an alternative embodiment, at least one of the first and second support bars may include an angled engagement element at at least one end thereof, the angled engagement element being engagable with a strut of a corresponding inner or outer support linkage of the tent frame in an in use condition.

The angled engagement arrangement between the support bars and the struts of the support linkages can beneficially distribute the weight of the hanging frame assembly across the tent frame without requiring sharp or awkward connectors which could unintentionally tear the tent fabric cover in use.

Preferably, the or each bridging bar may be formed having a hooked portion at each end thereof, the hooked portions being respectively connectable to the first and second support bars. In one alternative embodiment, the or each bridging bar may be formed having a pair of parallel plates at each end thereof which extend perpendicular to a longitudinal extent of the bridging bar, each pair of parallel plates defining a receiving slot respectively engagable about the first and second support bars.

Hooked or receiving portions of the bridging bars provide a simple mechanism of mounting the bridging bars to the support bars whilst evenly distributing the weight thereof, whilst also increasing the difficulty of accidental dislodgment of the bridging bar from the first and second support bars, increasing the safety of the assembly.

In an alternative embodiment, the plurality of support linkages may comprise a plurality of outer support linkages positioned at or adjacent to the upper end of adjacent support legs, the plurality of outer support linkages interconnecting adjacent support legs so as to be collapsible in concertina; the first support bar being engagable with the tent frame at or adjacent to one of the plurality of outer support linkages, and the second support bar being engagable with the tent frame at or adjacent to an opposite one of the plurality of outer support linkages.

In order to simplify the construction of the tent frame, it may be possible to provide a hanging frame assembly which spans the width or length of the hydroponic tent, thereby providing a position for environmental control equipment throughout the hydroponic tent.

At least one of the first support bar, second support bar, and the or each bridging element may be formed so as to have a circular profile, or alternatively may be formed so as to have a rectilinear profile.

Different shapes of support bars may confer different benefits upon the hanging frame assembly. For instance, a cylindrical arrangement may offer the best strength-to-weight ratio for the assembly, and may be devoid of sharp corners which may tear the tent fabric cover. Alternatively, a rectilinear arrangement may be simpler to manufacture.

Preferably, the support legs may be telescopically extendible.

The provision of telescopically extendible legs of the hydroponic tent allows the user to select the height of the equipment to be supported. This may be advantageous depending upon the clearance required by the user of the hydroponic tent.

Optionally, the inner surface of the tent fabric cover may include a light-reflective polyester resin coating.

The provision of a light-reflective coating which is formed from a polyester resin can not only confer the necessary reflectivity for the hydroponic tent, but can also confer waterproofing to the tent, thereby preventing water damage to the contents of the tent.

According to a second aspect of the invention, there is provided a hydroponic tent frame apparatus for hanging environmental monitoring or control equipment in a hydroponic tent, the hydroponic tent frame apparatus comprising: a tent frame having: a plurality of support legs; and a plurality of support linkages positioned at or adjacent to an in use upper end of the support legs, the plurality of support linkages being interconnected so as to allow the tent frame to collapse in concertina; and a hanging frame assembly having first and second support bars and at least one bridging bar, the first support bar being engagable with the tent frame at or adjacent to one of the plurality of support linkages, the second support bar being engagable with the tent frame at or adjacent to another one of the plurality of support linkages, and the at least one bridging bar being supportable between the first and second support bars.

According to a third aspect of the invention, there is provided a method of assembling a hydroponic tent in accordance with the first aspect of the invention, the method comprising the steps of: a] expanding the tent frame by separating the support legs such that the support linkages open in concertina; b] engaging the first support bar at or adjacent to one of the support linkages; c] engaging the second support bar at or adjacent to another support linkage which is parallel to the said support linkage; d] engaging the or each bridging bar between the first and second support bars; e] attaching the tent fabric cover over and around the tent frame to form an enclosed hydroponic tent; and f] attaching environmental monitoring or control equipment from the or each bridging bar.

BRIEF DESCRIPTION OF THE FIGURES

The invention will now be more particularly described, by way of example only, with reference to the accompanying drawings, in which.

DETAILED DESCRIPTION

Figure 1:
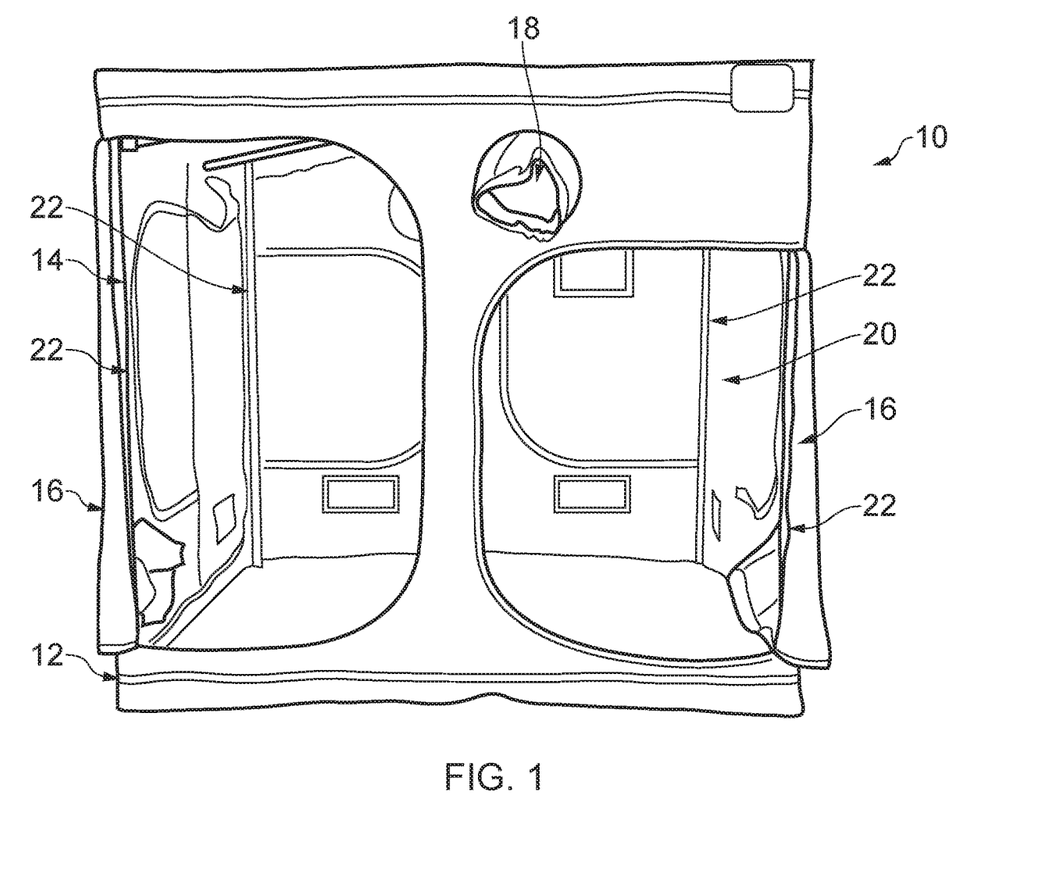
FIG. 1 shows a side view of one embodiment of a hydroponic tent in accordance with the first aspect of the invention.

Referring firstly to FIG. 1, there is shown a hydroponic tent, indicated globally at 10, and which is suitable for growing plants under environmental control. Environmental control in the present context is intended to comprise any or all of lighting or illumination control, temperature control, and humidity control, but other environmental characteristics could be controlled, for example, air flow.

The hydroponic tent 10 comprises a tent fabric cover 12 and a tent frame 14 for supporting the tent fabric cover 12 in an assembled condition. The assembled hydroponic tent 10 provides an enclosure within which plants may be grown in a controlled environment.

The hydroponic tent 10 is collapsible or compactable into a stowed or storage condition. The illustrated condition is an in use or assembled condition, in which it would be possible to position plants inside the hydroponic tent 10 for growing.

The tent fabric cover 12 is here formed as a cubic or cuboidal covering which preferably fully encloses the tent frame 14. Here, the tent fabric cover 12 forms a roof, walls and floor for the hydroponic tent 10, limiting the possibility of light or temperature leakage from the hydroponic tent 10 in use. The tent fabric cover 12 may, as illustrated, one or more doorways 16 or openings through which a user may access the interior of the hydroponic tent 10, and these are preferably provided as zip-fastenable openings.

The tent fabric cover 12 may further include one or more vented openings 18 via which air may enter and leave the hydroponic tent 10. Such vented openings 18 may also be provided as zip-fastenable openings. The vented openings 18 may be most appropriately opened in conditions in which the temperature and/or humidity inside the hydroponic tent 10 do not need to be controlled.

An inner surface 20 of the tent fabric cover 12 is formed or coated so as to have at least in part a light-reflective coating suitable for reflecting light produced inside the hydroponic tent 10. Preferably, this may be formed as a light-reflective polyester resin coating on the inner surface 20 of the tent fabric cover 12, such as Mylar®. The tent fabric cover 12 may also preferably be or formed treated so as to be waterproof, and other properties may be imbued into the tent fabric cover 12, for example, thermal insulation to protect plants inside from frost.

The tent frame 14 is formed having four support legs 22, which are here positioned at the four upright edges of the hydroponic tent 10. Each support leg 22 is preferably formed so as to be telescopically extendible, so as to permit a height of the hydroponic tent 10 to be altered.

Each of the support legs 22 is formed as an elongate pole, preferably having a telescopic element receivable therein. A lightweight construction of the hydroponic tent is preferred, and therefore aluminium may be used for the formation of the support legs, although other construction materials will be apparent to the skilled person, including, but not limited to, wood, steel, and plastics materials.

Adjacent support legs 22 are interconnected via outer support linkages 24 at in use upper ends 26 of the support legs 22 which allow the tent frame 14 to be collapsed or contracted in a concertina fashion. Here, each outer support linkage 24 is formed as a series of interconnected struts which form scissor-style linkages. In the depicted embodiment, two such scissor-style linkages are arranged to form each outer support linkage 24.

Figures 2, 2A, 2B, 3A:
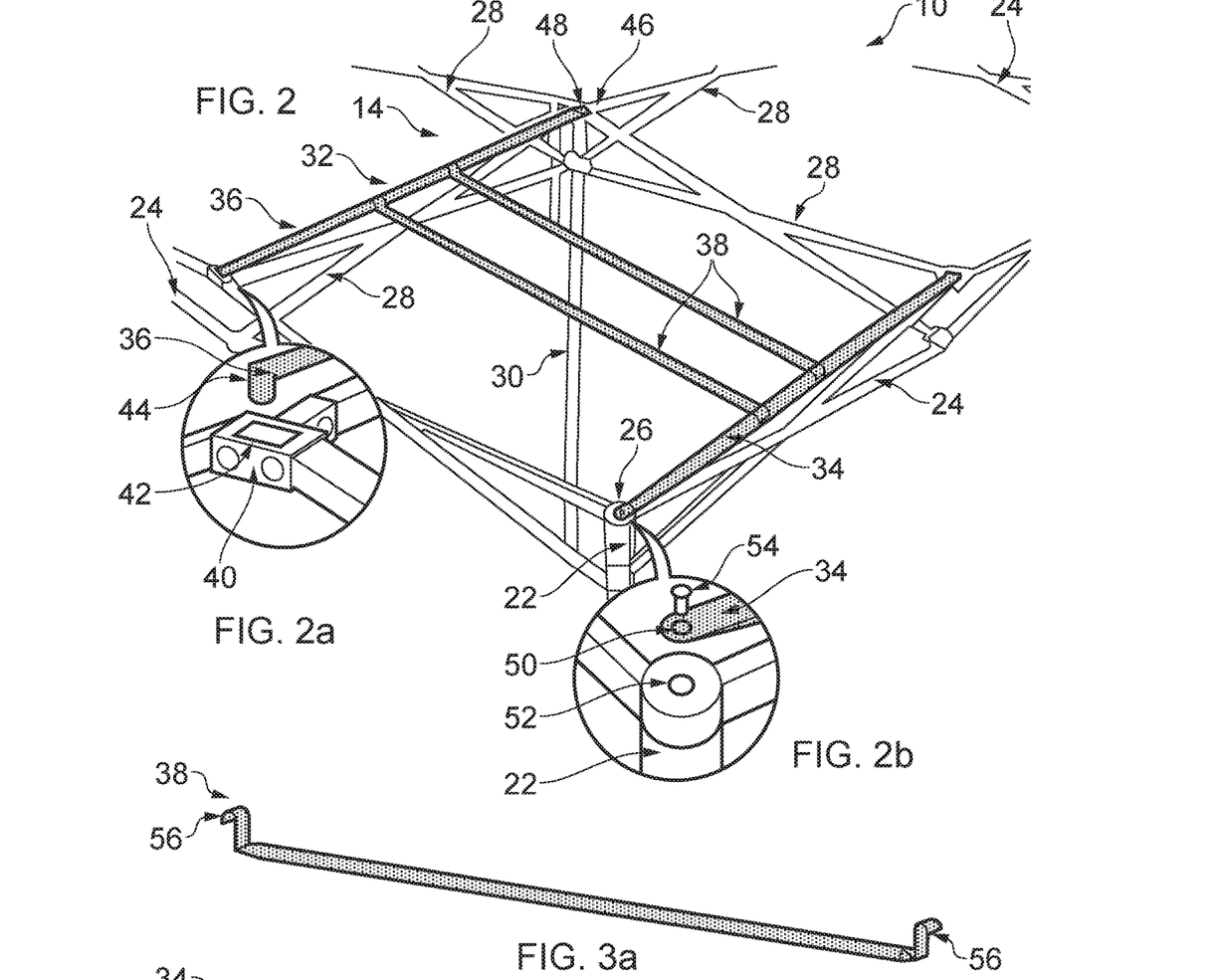
FIG. 2 shows a perspective representation of a first embodiment of a hydroponic tent frame apparatus in accordance with the second aspect of the invention.
FIG. 2a shows a magnified representation of an engagement joint of the hydroponic tent frame apparatus of FIG. 2.
FIG. 2b shows a magnified representation of a top portion of one support leg of the hydroponic tent frame apparatus of FIG. 2.
FIG. 3a shows a perspective representation of one bridging bar of the hydroponic tent frame apparatus of FIG. 2.

The tent frame 14 is illustrated in more detail in FIG. 2. The tent frame 14 further comprises a plurality of inner support linkages 28 which interconnect, either directly or indirectly, opposite outer support linkages 24, preferably from centre-to-centre across the tent frame 14. In this manner, a support linkage grid is formed across the top of the tent frame 14, providing additional structural support at a top of the hydroponic tent 10.

The inner support linkages 28 are formed so as to be collapsed or contracted in a concertina fashion, as per the outer support linkages 24. Preferably, each inner support linkage 28 is formed as a single scissor linkage which extends from a centre of its corresponding outer support linkage 24, with each inner support linkage 28 meeting at a centre point of the tent frame 14.

Preferably, there is provided a central support leg 30 which provides structural support in the centre of the hydroponic tent 10. The four inner support linkages 28 therefore each meet at the central support leg 30, and concertina towards the central support leg 30 when the tent frame 14 is being collapsed or compacted for stowing.

The central support leg 30 is preferably formed so as to be identical to the four support legs 22. In particular, should the four support legs 22 be telescopically extendible, the central support leg 30 should also be telescopically extendible.

FIG. 2 further shows a hanging frame assembly 32 which is suitable for mounting hanging environmental control equipment to, and in particular for mounting illumination devices inside the hydroponic tent 10.

The hanging frame assembly 32 is mountable to the tent frame 14, preferably at or adjacent to the in use uppermost part of the tent frame 14 so as to be able to mount environmental control equipment as high off the ground as possible, thereby maximising interior space in the hydroponic tent 10 for growth.

The hanging frame assembly 32 comprises first and second support bars 34, 36 which are engagable with the tent frame 14, and at least one bridging bar 38 which is mountable between the first and second support bars 34, 36 and from which environmental control equipment may be hung.

The first support bar 34 is mountable at or adjacent to one of the outer support linkages 24, preferably coincident with a vertical plane defined by the plane between the support legs 22 which are interconnected by the said outer support linkage 24. Preferably, the first support bar 34 may be sized so as to span half the distance between the support legs 22.

The second support bar 36 is mountable at or adjacent to an opposite neighbouring inner support linkage 28 of the tent frame 14, preferably coincident with a vertical plane which is parallel to that defined by the plane between the support legs 22 which are interconnected by the said outer support linkage 24 and which bisects the centre of the tent frame 14 in an in use condition. Where present, as in the embodiment depicted in FIG. 2, this plane will contain the central support leg 30.

Figure 3B:
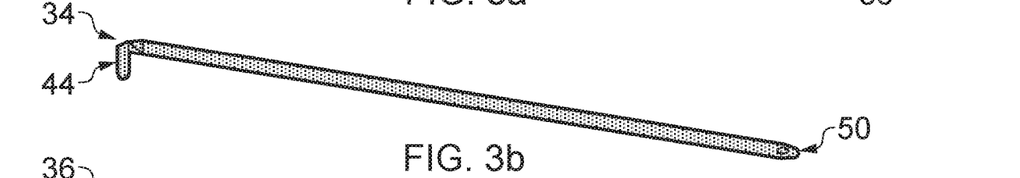
FIG. 3b shows a perspective representation of the first support bar of the hydroponic tent frame apparatus of FIG. 2.
Figure 3C:
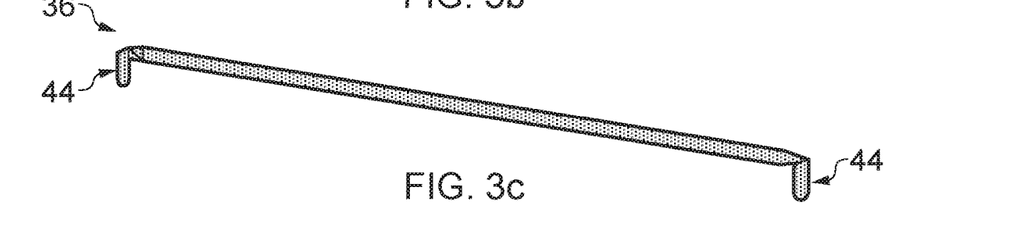
FIG. 3c shows a perspective representation of the second support bar of the hydroponic tent frame apparatus of FIG. 2.

The method of connection of the hanging frame assembly 32 to the tent frame 14 can be seen in FIG. 2, in conjunction with inset FIGS. 2a and 2b, with specific reference to FIGS. 3a to 3c which show the specific formations of the bridging bar 38 and the first and second support bars 34, 36.

FIG. 2a shows an engagement joint 40 of the tent frame 14, which is positioned at an intersection between adjacent inner and outer support linkages 28, 24. The engagement joint 40 is formed as a bracket having pivotable joints with in use upper struts of the adjacent inner and outer support linkages 28, 24, and, in the depicted embodiment, the bracket includes a joint receiving aperture 42.

The first support bar 34 has a support engagement element 44 which is formed as an in use depending projection from one end of the body of the first support bar 34. The second support bar 36 here similarly has a support engagement element 44 at either end of the body of the second support bar 36. The support engagement elements 44 are complementarily engagable with the joint receiving apertures 42 of the engagement joints 40 of the tent frame 14. The projections locate within the joint receiving apertures 42, and gravity holds the first and/or second bars 34, 36 in position.

The central support leg 30 here also includes a central engagement element 46, which may be formed as a central receiving aperture 48 positioned at an in use uppermost end of the central support leg 30. One of the support engagement elements 44 of the second support bar 36 may be receivable within the central receiving aperture 48 in the same way as the support engagement element 44 is receivable within the joint receiving aperture 42. The second support bar 36 can therefore be fully mounted to the tent frame 14 via an engagement joint 40 and the central support leg 30. If no central support leg 30 is present, there may be a central engagement element at the intersection between the inner support linkages 28, or alternatively the second support bar could be manufactured so as to span the full width of the tent frame 14.

In the depicted embodiment, the first support bar 34 is connected to its corresponding support leg 22 in a slightly different manner to the connection method of the second support bar 36. At the opposite end of the first support bar 34 to the support engagement element 44, there is instead provided a pin-receiving aperture 50. This allows coupling to a leg engagement element, here formed as a pin-receiving slot 52 in the upper end of the support leg 22, the pin-receiving aperture 50 and pin-receiving slot 52 being interconnected via a locking pin 54.

The first and second support bars 34, 36 provide support for the bridging bar or bars 38, which in turn provide direct support for one or more pieces of environmental control equipment. The structure of the bridging bar 38 is illustrated in FIG. 3a.

At either end of a body of the bridging bar 38 is formed so as to have a hooked portion 56, such that, in use, the body of the bridging bar 38 hangs below the hooked portions 56. The hooked portions 56 are shaped so as to be receivable around the bodies of the first and second support bars 34, 36, which can be seen in detail in FIGS. 3b and 3c, respectively.

The bodies of at least the first and second support bars 34, 36, and/or the bridging bar or bars 38 may be cylindrical in profile so as to facilitate engagement between the hooked portions 56 and the first and second support bars 34, 36.

Preferably, the first and second support bars 34, 36 and the or each bridging bar 38 are formed from a rigid material which is capable of supporting the weight of the environmental control equipment to be hoisted inside the hydroponic tent 10. This may preferably be steel, formed in hollow tubes to minimise the weight; however, other appropriate materials will be apparent to the skilled person. The tent frame 14 should also be formed from a material which is capable of supporting both the weight of the hanging frame apparatus 32 and the associated environmental control equipment.

To assemble the hydroponic tent 10, the tent frame 14 can be expanded by separating the support legs 22 such that the inner and outer support linkages 28, 24 open in concertina. The first support bar 34 can then be engaged at or adjacent to one of the outer support linkages 24. In the previously described embodiment, this can be achieved by engaging the support engagement element 44 with the joint receiving aperture 42 of the engagement joint 40 of the outer support linkage 24, and interconnecting the pin-receiving aperture 50 of the first support bar 34 with the pin receiving slot 52 of a support leg 22 using a locking pin 54.

The second support bar 36 may also be engaged, sequentially or simultaneously, at or adjacent to an inner support linkage 28 which is parallel and adjacent to the said outer support linkage 24. In the depicted embodiment, this is achieved by inserting the support engagement elements 44 with the appropriate joint receiving aperture 42 of another engagement joint 40 and with the central receiving aperture 48.

Once both the first and second support bars 34, 36 are in position, the or each bridging bar 38 can be engaged between the first and second support bars 34, 36, thereby completing the construction of the hanging frame assembly 32. The tent fabric cover 12 may then be attached over and around the tent frame 14 to form an enclosed hydroponic tent 10, and environmental monitoring or control equipment can be attached from the or each bridging bar 38.

Figure 4:
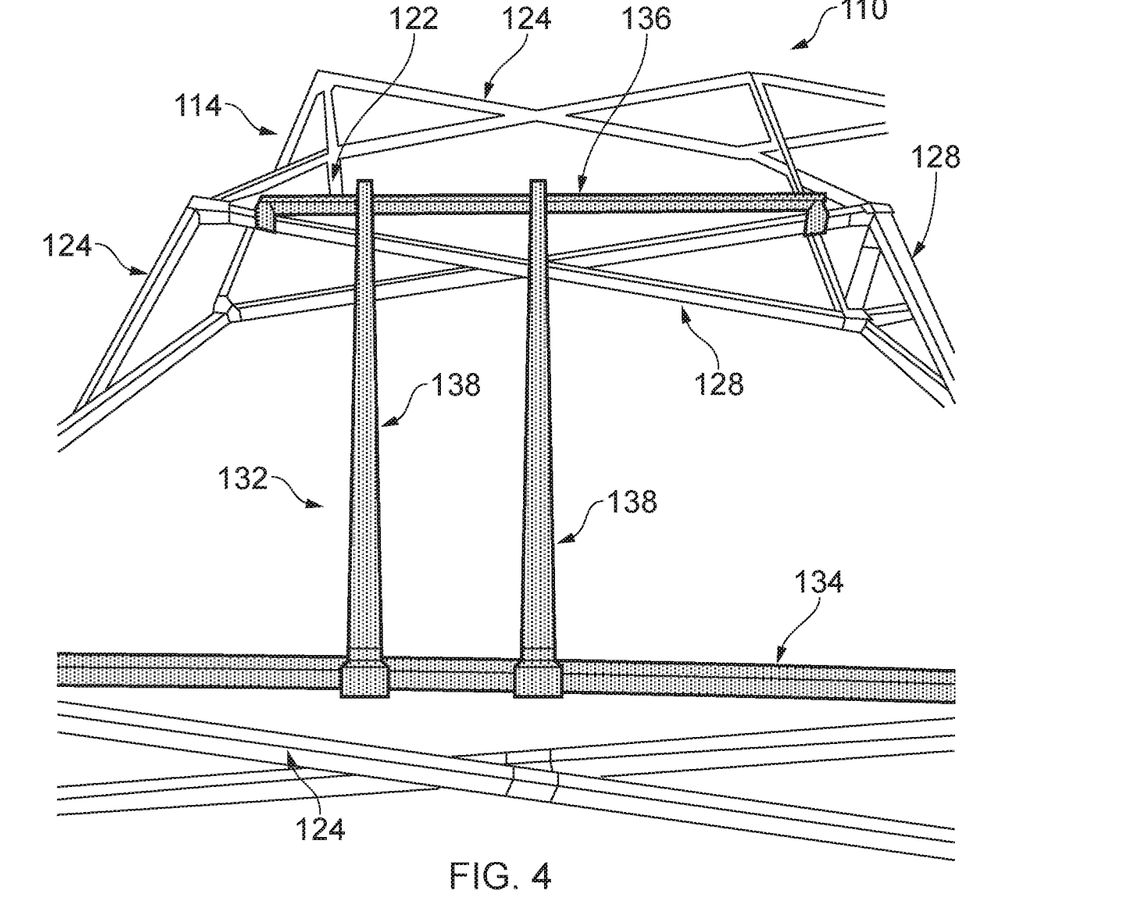
FIG. 4 shows a perspective representation of a second embodiment of a hydroponic tent frame apparatus in accordance with the second aspect of the invention.

FIG. 4 shows a second embodiment of a tent frame and hanging frame assembly forming a hydroponic tent frame apparatus, indicated globally at 110. Identical or similar features to those of the first embodiment will be referenced using identical or similar reference numerals, and further detailed description will be omitted for brevity.

The tent frame 114 includes inner and outer support linkages 128, 124 and four support legs 122; however no central support leg is provided here. The connection of the hanging frame apparatus 132 to the tent frame 114 is different to that of the first embodiment, as described below.

Figure 5A:
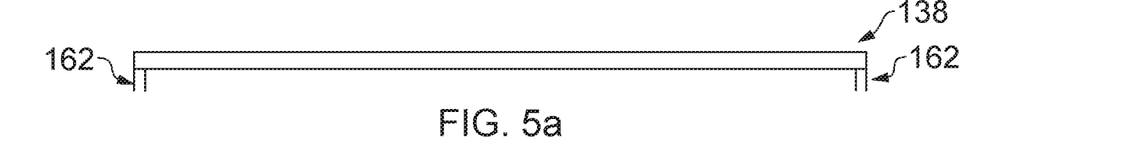
FIG. 5a shows a side representation of one bridging bar of the hydroponic tent frame apparatus of FIG. 4.
Figure 5B:
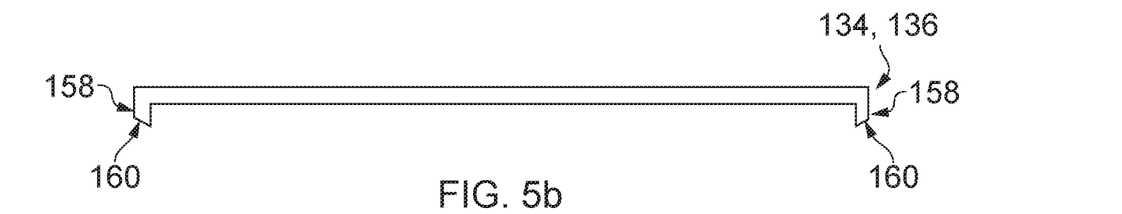
FIG. 5b shows a side representation of either the first or second support bar of the hydroponic tent frame apparatus of FIG. 4.

The first and second support bars 134, 136 are here formed so as to be identical, having bodies having a rectilinear profile, and each having an angled engagement element 158 at at least one end thereof. Each angled engagement element 158 may be formed by two parallel plates 160 which extend in a longitudinal direction of the body of the first or second support bar 134, 136. Preferably, the angled engagement elements 158 may be pivotably engagable with the body of the respective first and/or second support bars 134, 136 for ease of engagement with the inner and/or outer support linkages 128, 124.

A surface of the angled engagement element 158 between the plates 160 is formed so as to be matingly engagable with the angle of the struts of the corresponding inner or outer support linkages 128, 124 in an in use condition of the tent frame 114. Each of the first and second support bars 134, 136 therefore effectively brace across the scissor linkage of the corresponding inner or outer support linkages 128, 124. The form of the first and second support bars 134, 136 can be seen in FIG. 5b.

The or each bridging bar 138 is here formed having a pair of parallel plates 162 at each end of its body which extend perpendicularly to the longitudinal direction of the body of the bridging bar 138. These parallel plates 162 are able to extend around and seat upon the respective first and second support bars 134, 136, thereby securing safely in place. Environmental control equipment can then be mounted to the or each bridging bar 138 as in the first embodiment.

In order to provide structural rigidity to the tent frame in the above-described embodiments, both inner and outer support linkages are provided. This, however, only allows the hanging frame assembly to span from an outer linkage to an inner linkage, which will be less than the full span of either the width or length of the hydroponic tent.

It may therefore be advantageous to remove the inner support linkages, and connect both of the first and second support bars respectively to opposite outer support linkages. In doing so, a hanging frame assembly can be constructed which spans the full width or length of the hydroponic tent, increasing the available space for mounting environmental control equipment. This may be more appropriate for smaller hydroponic tents, in which the central support leg is not required.

It will be appreciated that whilst a cubic or cuboidal hydroponic tent has been described above, it may be possible to construct tents having different areas or being formed based on different geometric shapes. Triangular, hexagonal, or octagonal tents may be feasible, and the present invention could be applied in such scenarios as well.

It is therefore possible to provide a hydroponic tent which has a tent frame which can be readily collapsed or contracted in a concertina fashion, but which can be combined with a hanging frame assembly to safely mount hanging equipment therefrom. This is particularly useful in mounting lighting assemblies inside hydroponic tents which would otherwise waste valuable floorspace within the tent.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

What is claimed is:

1. A hydroponic tent comprising:
    a tent fabric cover having an inner surface which is at least in part light-reflective;
    a tent frame to support the tent fabric cover in an assembled condition, the tent frame comprising:
        a plurality of support legs; and
        a plurality of support linkages positioned at or adjacent to an in use upper end of the support legs, the plurality of support linkages being interconnected so as to allow the tent frame to collapse in concertina; and
    a hanging frame assembly having first and second support bars and at least one bridging bar, the first support bar being engagable with the tent frame at or adjacent to one of the plurality of support linkages, the second support bar being engagable with the tent frame at or adjacent to another one of the plurality of support linkages, and the at least one bridging bar being supportable between the first and second support bars,
    wherein the plurality of support linkages comprise a plurality of outer support linkages positioned at or adjacent to the upper end of adjacent support legs, the plurality of outer support linkages interconnecting adjacent support legs so as to be collapsible in concertina;
    the tent frame further comprising a plurality of inner support linkages which are spaced apart from the support legs and which interengage opposite outer support linkages so as to be collapsible in concertina; and
    the first support bar being engagable with the tent frame at or adjacent to one of the plurality of outer support linkages, and the second support bar being engagable with the tent frame at or adjacent to one of the plurality of inner support linkages,
    wherein the tent frame further comprises a central support leg, positioned at an intersection between the plurality of inner support linkages, and
    wherein the central support leg comprises a central engagement element at an in use upper end thereof, the second support bar having a complementary support engagement element for interengagement of the tent frame and the second support bar.

2. The hydroponic tent as claimed in claim 1, wherein the central engagement element is a central receiving aperture, and the support engagement element is a projection receivable within the central receiving aperture.

3. The hydroponic tent as claimed in claim 1, wherein the tent frame further comprises an engagement joint at an intersection between adjacent inner and outer support linkages, at least one of the first and second support bars having a complementary support engagement element for interengagement of the tent frame and first and/or second support bars.

4. The hydroponic tent as claimed in claim 3, wherein the engagement joint includes a joint receiving aperture, and the complementary support engagement element is a projection receivable within the joint receiving aperture.

5. The hydroponic tent as claimed in claim 3, wherein the engagement joint is pivotably engagable with the said adjacent inner and outer support linkages.

6. The hydroponic tent as claimed in claim 1, wherein at least one support leg comprises a leg engagement element at an in use upper end of the at least one support leg, the first support bar having a complementary support engagement element for interengagement of the tent frame and the first support bar.

7. The hydroponic tent as claimed in claim 6, wherein the leg engagement element is a pin-receiving slot and the support engagement element is a pin-receiving aperture, and further comprising a locking pin to interconnect the pin-receiving slot and pin-receiving aperture.

8. The hydroponic tent as claimed in claim 1, wherein at least one of the first and second support bars includes an angled engagement element at least one end thereof, the angled engagement element being engagable with a strut of a corresponding support linkage of the tent frame in an in use condition.

9. The hydroponic tent as claimed in claim 1, wherein the at least one bridging bar is formed having a hooked portion at each end thereof, the hooked portions being respectively connectable to the first and second support bars.

10. The hydroponic tent as claimed in claim 1, wherein the at least one bridging bar is formed having a pair of parallel plates at each end thereof which extend perpendicular to a longitudinal extent of the bridging bar, each pair of parallel plates defining a receiving slot respectively engagable about the first and second support bars.

11. The hydroponic tent as claimed in claim 1, wherein the plurality of support linkages comprise a plurality of outer support linkages positioned at or adjacent to the upper end of adjacent support legs, the plurality of outer support linkages interconnecting adjacent support legs so as to be collapsible in concertina;

the first support bar being engagable with the tent frame at or adjacent to one of the plurality of outer support linkages, and the second support bar being engagable with the tent frame at or adjacent to an opposite one of the plurality of outer support linkages.

12. The hydroponic tent as claimed in claim 1, wherein at least one of the first support bar, second support bar, and the at least one bridging bar is formed so as to have a circular profile.

13. The hydroponic tent as claimed in claim 1, wherein at least one of the first support bar, second support bar, and the at least one bridging bar is formed so as to have a rectilinear profile.

14. The hydroponic tent as claimed in claim 1, wherein the support legs are telescopically extendible.

15. The hydroponic tent as claimed in claim 1, wherein the inner surface of the tent fabric cover includes a light-reflective polyester resin coating.

16. A method of assembling the hydroponic tent as claimed in claim 1, the method comprising the steps of:
 a] expanding the tent frame by separating the support legs such that the support linkages open in concertina;
 b] engaging the first support bar at or adjacent to one of the support linkages;
 c] engaging the second support bar at or adjacent to another support linkage which is parallel to the said support linkage;
 d] engaging the at least one bridging bar between the first and second support bars;
 e] attaching the tent fabric cover over and around the tent frame to form an enclosed hydroponic tent; and
 f] attaching environmental monitoring or control equipment from the at least one bridging bar.

* * * * *